United States Patent
Seo et al.

(10) Patent No.: US 9,871,635 B2
(45) Date of Patent: Jan. 16, 2018

(54) PIGGYBACKING UPLINK CONTROL INFORMATION ONTO PUSCH IN LTE-ADVANCED

(75) Inventors: Dong Youn Seo, Anyang-si (KR); Joon Kui Ahn, Anyang-si (KR); Min Gyu Kim, Anyang-si (KR); Suck Chel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 600 days.

(21) Appl. No.: 13/520,280

(22) PCT Filed: Jan. 4, 2011

(86) PCT No.: PCT/KR2011/000017
§ 371 (c)(1),
(2), (4) Date: Jul. 2, 2012

(87) PCT Pub. No.: WO2011/081505
PCT Pub. Date: Jul. 7, 2011

(65) Prior Publication Data
US 2012/0294251 A1    Nov. 22, 2012

Related U.S. Application Data

(60) Provisional application No. 61/324,299, filed on Apr. 14, 2010, provisional application No. 61/293,691, (Continued)

(51) Int. Cl.
*H04L 5/14* (2006.01)
*H04L 5/00* (2006.01)
(Continued)

(52) U.S. Cl.
CPC .......... *H04L 5/0053* (2013.01); *H04L 1/0026* (2013.01); *H04L 1/1664* (2013.01);
(Continued)

(58) Field of Classification Search
CPC .. H04W 72/1284; H04L 1/1664; H04L 5/001; H04L 5/0028; H04L 5/0091; H04L 5/0053
See application file for complete search history.

(56) References Cited

U.S. PATENT DOCUMENTS

2008/0102846 A1    5/2008    Kim et al.
2008/0153425 A1    6/2008    Heo et al.
(Continued)

FOREIGN PATENT DOCUMENTS

KR    10-2008-0029734 A    4/2008
KR    10-2008-0056621 A    6/2008
(Continued)

OTHER PUBLICATIONS

LG Electronics, UCI Piggyback onto PUSCH in LTE-Advanced for CM Preserving Transmission, R1-094469, 3GPP TSG RAN WG1 meeting #59, Jeju, Korea, Nov. 9-13, 2009, pp. 1-3.*
(Continued)

*Primary Examiner* — Benjamin Lamont
(74) *Attorney, Agent, or Firm* — Birch, Stewart, Kolasch & Birch, LLP

(57) ABSTRACT

Provided are a method and apparatus for uplink transmission in a wireless communication system. A terminal sets an uplink transmission mode for a plurality of component carriers, multiplexes an uplink transport block and uplink control information in accordance with the uplink transmission mode, and transmits the multiplexed control information through one of the plurality of component carriers on an uplink channel.

12 Claims, 11 Drawing Sheets

Related U.S. Application Data filed on Jan. 10, 2010, provisional application No. 61/292,156, filed on Jan. 4, 2010.

(51) Int. Cl.
*H04L 1/16* (2006.01)
*H04L 1/00* (2006.01)
*H04L 1/18* (2006.01)

(52) U.S. Cl.
CPC ............ *H04L 5/001* (2013.01); *H04L 5/0028* (2013.01); *H04L 5/0091* (2013.01); *H04L 1/1812* (2013.01); *H04L 5/0007* (2013.01); *H04L 5/0023* (2013.01); *H04L 5/0044* (2013.01); *H04L 5/0085* (2013.01)

(56) References Cited

U.S. PATENT DOCUMENTS

| | | | |
|---|---|---|---|
| 2008/0310360 A1* | 12/2008 | Heo et al. ................. | 370/329 |
| 2009/0073922 A1* | 3/2009 | Malladi et al. ............ | 370/328 |
| 2009/0316626 A1* | 12/2009 | Lee et al. .................. | 370/328 |
| 2010/0054203 A1* | 3/2010 | Damnjanovic et al. ...... | 370/329 |
| 2010/0091919 A1* | 4/2010 | Xu .......................... | H04L 1/0025 |
| | | | 375/346 |
| 2010/0098012 A1* | 4/2010 | Bala et al. ................. | 370/329 |
| 2011/0158117 A1* | 6/2011 | Ho et al. ................... | 370/252 |
| 2011/0261776 A1* | 10/2011 | Ahn ......................... | H04L 5/0007 |
| | | | 370/329 |

FOREIGN PATENT DOCUMENTS

| | | |
|---|---|---|
| KR | 10-2009-0015813 A | 2/2009 |
| WO | WO 2009099301 A2 * | 8/2009 |

OTHER PUBLICATIONS

LG Electronics, UCI Piggyback onto PUSCH in LTE-Advanced, R1-100218, 3GPP TSG RAN WG1 meeting #59b, Valencia, Spain, Jan. 18-22, 2010, pp. 1-5.*
LG Electronics, PUSCH Multiplexing of Data, Control, and ACK/NACK Information, 3GPP TSG RAN WG1#51bis, R1-080267, Agenda Item 6.1.4, Sevilla, Spain, Jan. 14-18, 2008, pp. 1-19.*
Motorola, "PDCCH Design for Carrier Aggregation and Post Rel-8 Features," 3GPP TSG RAN1 #57bis, Los Angeles, Jun. 29-Jul. 3, 2009 (retrieved on Jun. 24, 2009), R1-092641, pp. 1-5.
Panasonic, "Discussion on PDCCH with Carrier Indicator," 3GPP TSG-RAN WG1 Meeting #59, Jeju, Korea, Nov. 9-13, 2009 (retrieved on Nov. 2, 2009), R1-094496, pp. 1-3.
Qualcomm Europe, "CM Analysis of Concurrent PUSCH and PUCCH UL Transmission for LTE-A," 3GPP TSG RAN WG1 #55bis, Jan. 12-16, 2009 (retrieved on Jan. 8, 2009), Ljubljana, Slovenia, R1-090363, pp. 1-7.
Alcatel Lucent, "Support of carrier aggregation for FDD and related control signalling with blind decoding reduction", 3GPP TSG RAN WG1 #58 Meeting, R1-09-3014, Shenzhen, China, Aug. 24-28, 2009, pp. 1-6.
LG Electronics, "Some aspects of PUCCH/PUSCH transmission over multiple component carriers", 3GPP TSG RAN WG1 #55bis, R1-090208, Ljubljana, Slovenia, Jan. 12-16, 2009, 5 pages.
Nokia Siemens Networks et al., "UL control signalling to support bandwidth extension in LTE-Advanced", 3GPP TSG RAN WG1 #55bis, R1-090234, Ljubljana, Slovenia, Jan. 12-16, 2009, 5 pages.
ZTE, "Uplink Control Channel Design for LTE-Advanced", TSG-RAN WG1 #57bis, R1-092464, San Francisco, USA, Jun. 29-Jul. 3, 2009, pp. 1-6.

\* cited by examiner

US 9,871,635 B2

PIGGYBACKING UPLINK CONTROL INFORMATION ONTO PUSCH IN LTE-ADVANCED

CROSS REFERENCE TO RELATED APPLICATIONS

This application is the National Phase of PCT/KR2011/000017 filed on Jan. 4, 2011, which claims priority under 35 U.S.C. 119(e) to U.S. Provisional Application Nos. 61/292,156 filed on Jan. 4, 2010, 61/293,691 filed on Jan 10, 2010 and 61/324,299 filed on Apr. 14, 2010, all of which are hereby expressly incorporated by reference into the present application.

TECHNICAL FIELD

The present invention relates to wireless communications, and more particularly, to a method and apparatus for uplink transmission supporting a plurality of component carriers in a wireless communication system.

Background Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas.

In recent years, there is an ongoing discussion on 3GPP LTE-advanced (LTE-A) evolved from the 3GPP LTE. The 3GPP LTE-A ensures backward compatibility with the 3GPP LTE, and supports a wideband by using carrier aggregation.

The 3GPP LTE system supports only one bandwidth (i.e., one component carrier) among {1.4, 3, 5, 10, 15, 20}MHz. In order to support a full bandwidth of 40 MHz, carrier aggregation uses two component carriers having a bandwidth of 20 MHz or uses 3 component carriers respectively having bandwidths of 20 MHz, 15 MHz, and 5 MHz. One component carrier corresponds to one cell.

The carrier aggregation can support backward compatibility with legacy systems, and can significantly increase a data rate by using a plurality of component carriers.

The 3GPP LTE is a single-carrier system in which a control channel and a data channel are designed on the basis of a single component carrier. However, it may be ineffective if a channel structure of the single-carrier system is directly used in a multi-carrier system.

Therefore, there is a need to consider power consumption for improving a waiting time of a user equipment when designing an uplink channel. In order to increase efficiency of a power amplifier of the user equipment, it is important to maintain a low peak-to-average power ratio (PARP) or a low cubic metric (CM).

SUMMARY OF INVENTION

Technical Problem

The present invention provides a method and apparatus for uplink transmission supporting a plurality of component carriers in a wireless communication system.

Technical Solution

In an aspect, a method for uplink transmission in a wireless communication system is provided. The method includes setting an uplink transmission mode for a plurality of component carriers, multiplexing an uplink transport block and uplink control information in accordance with the uplink transmission mode, and transmitting the multiplexed control information on an uplink channel through one of the plurality of component carriers.

The setting of the uplink transmission mode may comprise receiving information regarding the uplink transmission mode from a base station.

The uplink transmission mode may be one of a multi-channel transmission mode capable of transmitting a plurality of uplink channels through each component carrier and a single-channel transmission mode capable of transmitting one uplink channel through each component carrier.

If the uplink transmission mode is the multi-channel transmission mode, the uplink control information multiplexed to the uplink transport block may be control information transmitted on the same component carrier as a component carrier used in transmission of the uplink transport block.

If the uplink transmission mode is the single-channel transmission mode, the uplink control information multiplexed to the uplink transport block may be control information transmitted through the same component carrier as a component carrier used in transmission of the uplink transport block or control information transmitted through a different component carrier.

In another aspect, a user equipment for uplink transmission in a wireless communication system is provided. The user equipment includes a radio frequency (RF) unit for transmitting and receiving a radio signal, and a processor coupled to the RF unit and configured to set an uplink transmission mode for a plurality of component carriers, multiplex an uplink transport block and uplink control information in accordance with the uplink transmission mode, and transmit the multiplexed control information on an uplink channel through one of the plurality of component carriers.

Advantageous Effects

A peak-to-average power ratio (PARP)/cubic metric (CM) property can be prevented from deterioration in uplink transmission, and battery consumption of a user equipment can be decreased.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Figure 1:
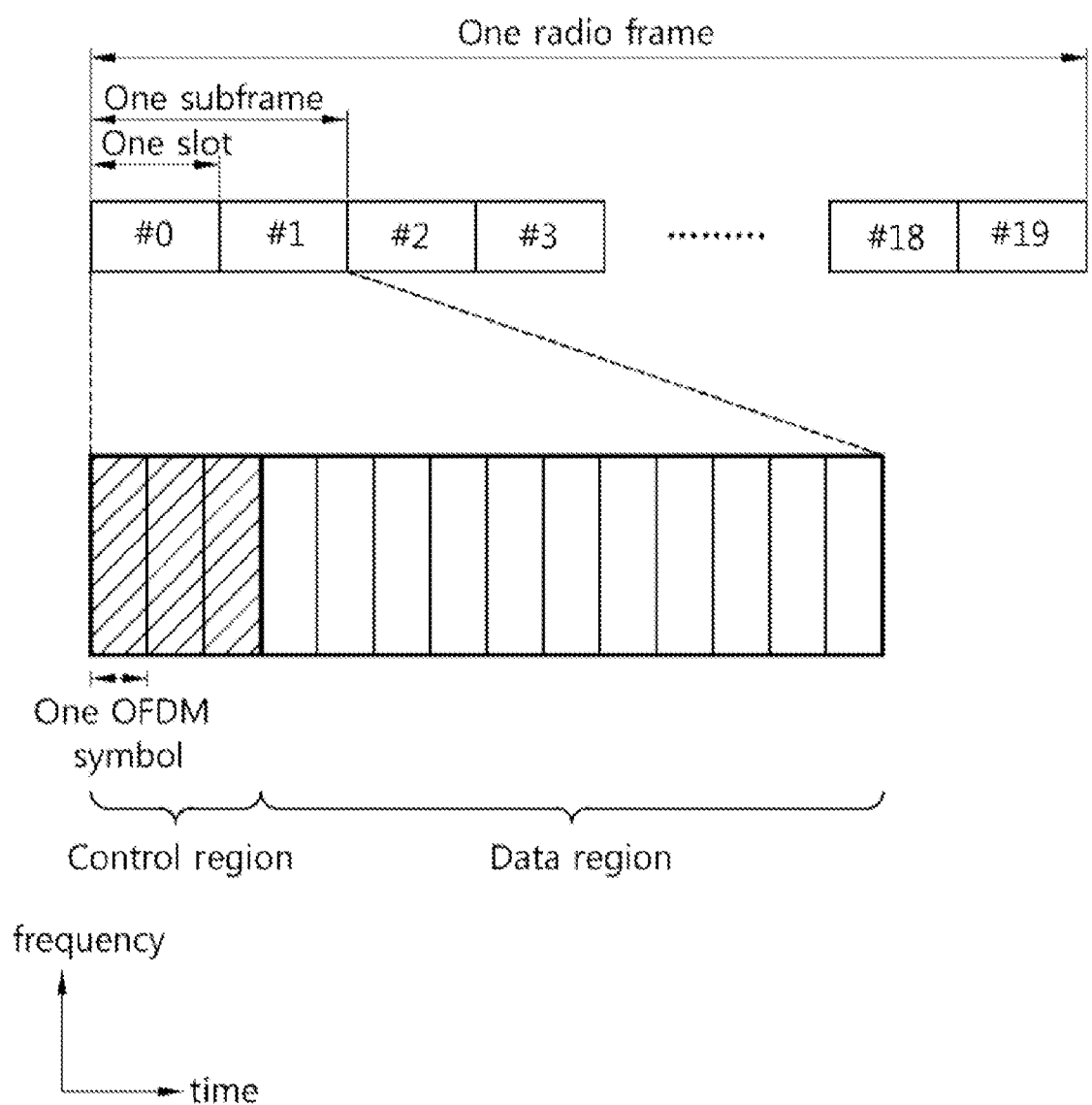
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame consists of 20 slots indexed with 0 to 19. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI through the PCFICH, and thereafter monitors the PDCCH.

Unlike the PDCCH, the PCFICH is transmitted using a fixed PCFICH resource of the subframe, without using blind decoding.

The PHICH carries a positive acknowledgement (ACK)/negative-acknowledgement (NACK) signal for uplink hybrid automatic repeat request (HARQ). The ACK/NACK signal for uplink (UL) data on the PUSCH transmitted by the UE is transmitted on the PHICH.

A physical broadcast channel (PBCH) is transmitted in first four OFDM symbols in a $2^{nd}$ slot of a $1^{st}$ subframe of the radio frame. The PBCH carries system information necessary for communication between a UE and a BS. The system information transmitted on the PBCH is referred to as a master information block (MIB). In comparison thereto, system information transmitted on the PDCCH and indicated by the PDCCH is referred to as a system information block (SIB).

Control information transmitted on the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking.

The BS determines a PDCCH format according to DCI to be transmitted to the UE, attaches a cyclic redundancy check (CRC) to the DCI, and masks a unique identifier (referred to as a radio network temporary identifier (RNTI)) to the CRC according to an owner or usage of the PDCCH.

Figure 2:
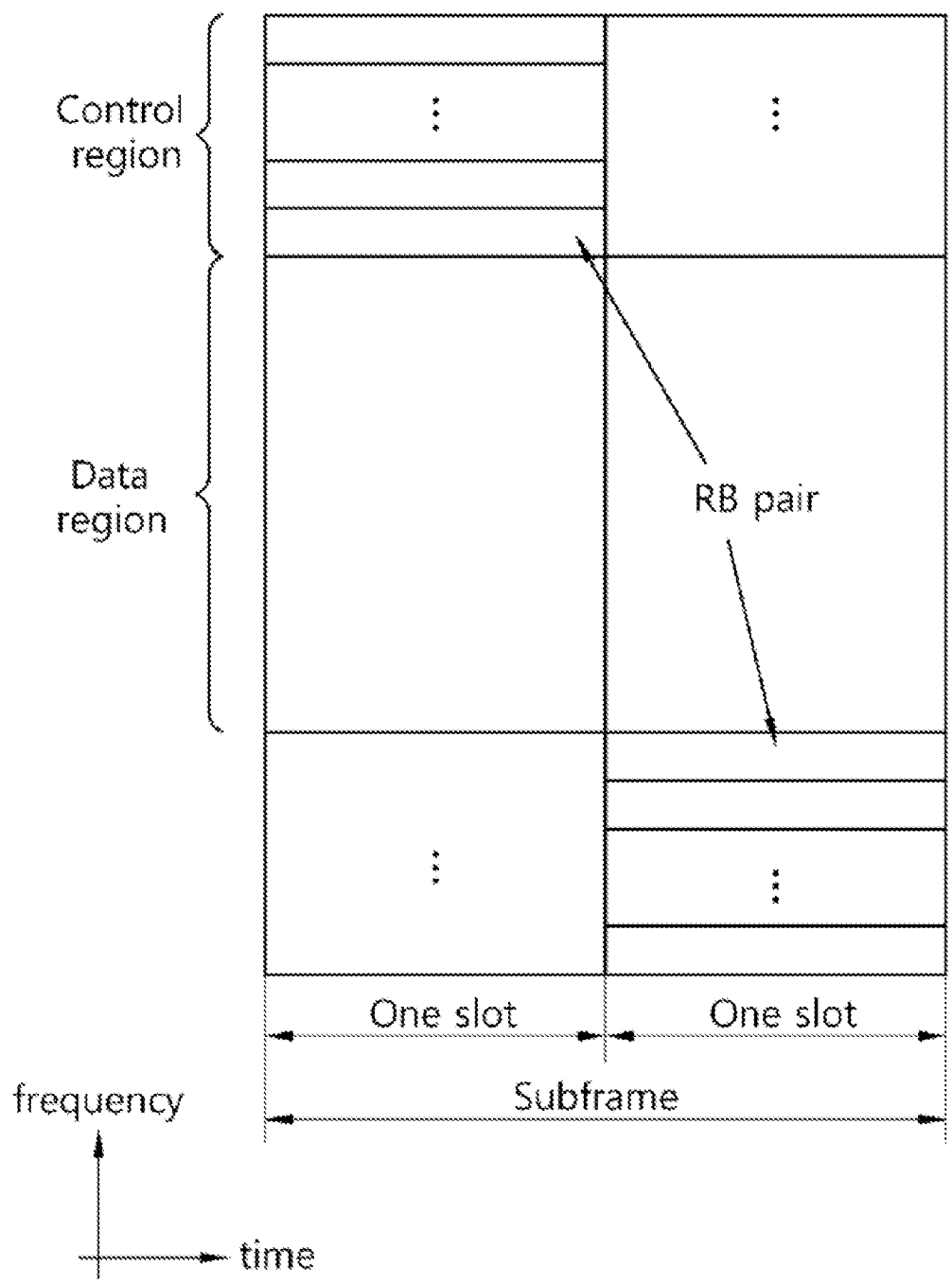
FIG. 2 shows an example of an uplink subframe in the 3GPP LTE.

FIG. 2 shows an example of a UL subframe in the 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH for one UE is assigned to a resource block (RB) pair of RBs in a subframe. The RBs belonging to the RB pair occupy different subcarriers in each of the two slots. In this case, it is said that the RB pair assigned to the PUCCH is frequency hopped in a slot boundary.

In order to increase a power amplifier of a UE, 3GPP LTE applies single carrier frequency division multiple access (SC-FDMA) having a good peak-to-average power ratio (PAPR)/cubic metric (CM) property to UL transmission. For example, for PUSCH transmission, information bits are subjected to DFT-spreading and thereafter are subjected to IFFT. However, when the DFT-spread symbols are mapped to discontinuous subcarriers, a single-carrier property may deteriorate.

In order to maintain the single-carrier property, when user traffic and UL control information are transmitted simultaneously in a specific subframe, the 3GPP LTE multiplexes and transmits the user traffic and the UL control information through a PUSCH. For example, a periodic channel quality indicator (CQI) is transmitted on a PUCCH, and a UL transport block is transmitted on the PUSCH. However, when the periodic CQI and the UL transport block are transmitted simultaneously in the specific subframe, the periodic CQI and the UL transport block are multiplexed and transmitted on the PUSCH.

The multiplexed UL control information includes a CQI indicating a DL channel state, a precoding matrix indicator (PMI), a rank indicator (RI) and/or ACK/NACK for HARQ.

The UL control information multiplexed to the UL transport block is called multiplexed control information or piggyback control information.

Figure 3:
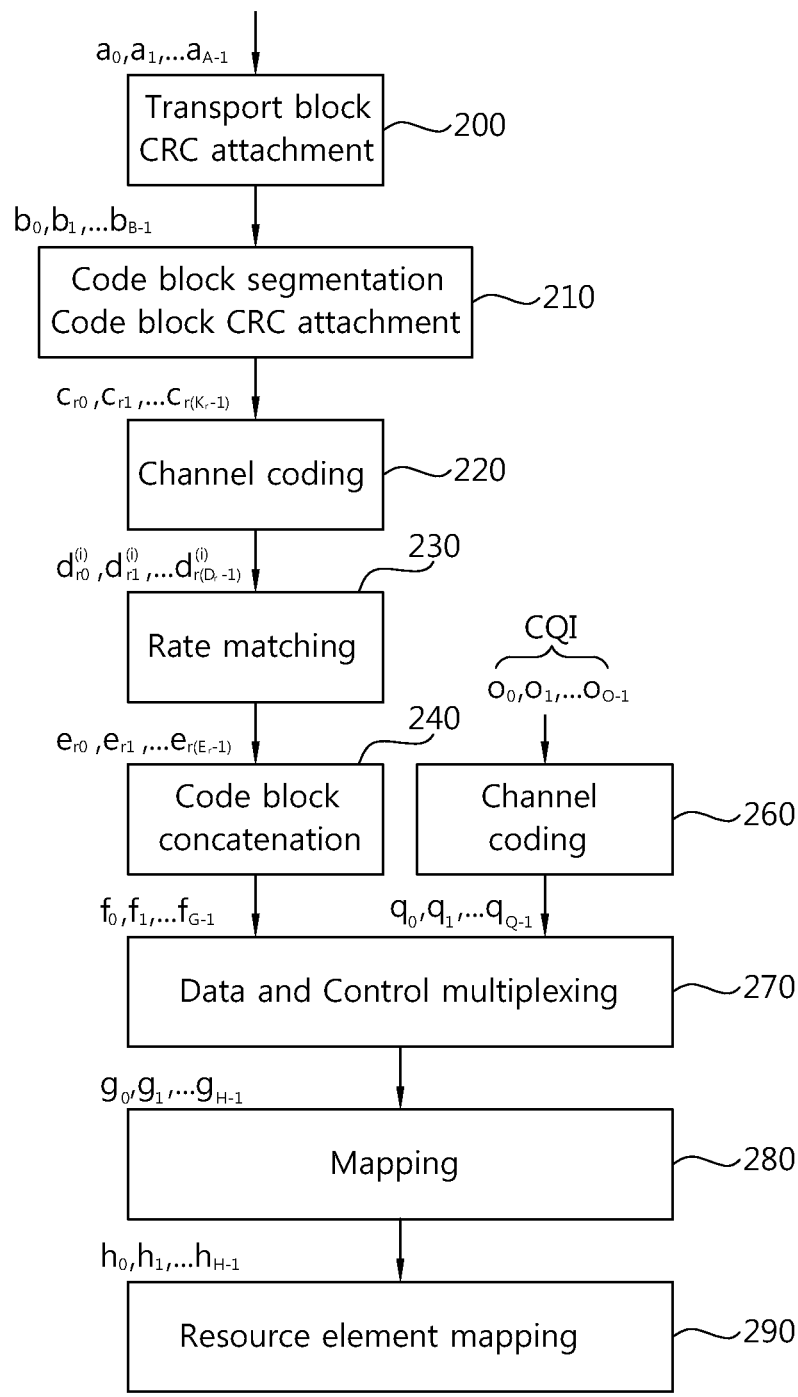
FIG. 3 shows an example of multiplexing an uplink transport block and a channel quality indicator (CQI).

FIG. 3 shows an example of multiplexing a UL transport block and a CQI.

Data bits $a_0, a_1, \ldots, a_{A-1}$ are provided in every TTI in a format of one transport block. First, cyclic redundancy check (CRC) parity bits $p_0, p_1, \ldots, p_{L-1}$ are attached to the data bits $a_0, a_1, \ldots, a_{A-1}$ to generate CRC-attached bits $b_0, b_1, \ldots, b_{B-1}$ (step 200). Herein, B=A+L. Equation 1 below shows a relationship between $a_k$ and $b_k$.

$$b_k = a_k \text{ for } k=0, 1, \ldots, A-1$$

$$b_k = p_{k-A} \text{ for } k=A, A+1, \ldots, A+L-1 \qquad \text{[Equation 1]}$$

The CRC-attached bits $b_0, \ldots, b_{B-1}$ are segmented in a code block unit, and the CRC parity bits are re-attached in the code block unit (step 210). $c_{r0}, c_{r1}, \ldots, c_{r(kr-1)}$ denote a bit sequence output after the code block segmentation. Herein, if a total number of code blocks is C, r denotes a code block number, and Kr denotes the number of bits for the code block number r.

Channel coding is performed on a bit sequence for a given code block (step 220). $d^{(i)}_0, d^{(i)}_1, \ldots, d^{(i)}_{D-1}$ denote encoded bits, D denotes the number of encoded bits for each output stream, and i denotes an index of a bit stream output from an encoder.

Rate matching is performed on the encoded bits (step 230). Then, code block concatenation is performed on the rate-matched bits (step 240). As a result, a data bit sequence $f_0, f_1, \ldots, f_{G-1}$ is generated. Herein, G denotes a total number of encoded bits used to transmit bits other than bits used in control information transmission when the control information is multiplexed on a PUSCH.

Channel coding is performed on CQI values $o_0, o_1, \ldots, o_{O-1}$ (where O is the number of CQI bits) to generate a control information bit sequence $q_0, q_1, \ldots, q_{Q-1}$ (step 260). The CQI can use independent channel coding different from that used for the data. For example, when a block code (32, O) is used as channel coding for the CQI.

$b_0, b_1, \ldots, b_{31}$ denote an intermediate sequence for CQI channel coding and can be generated by Equation 2 below.

$$b_i = \sum_{n=0}^{O-1} (o_n \cdot M_{i,n}) \bmod 2, \text{ where } i = 0, 1, 2, \ldots, 31 \qquad \text{[Equation 2]}$$

The control information bit sequence $q_0, q_1, \ldots, q_{Q-1}$ is generated by cyclically repeating the intermediate sequence $b_0, b_1, \ldots, b_{31}$ according to Equation 3 below.

$$q_i = b_{(i \bmod 31)}, \text{ where } i=0, 1, \ldots, Q-1 \qquad \text{[Equation 3]}$$

A data bit sequence $f_0, f_1, \ldots, f_{G-1}$ is generated as described above and is multiplexed together with the control information bit sequence $q_0, q_1, \ldots, q_{Q-1}$ into a multiplexed sequence $g_0, g_1, \ldots, g_{H-1}$ (step 270). In a process of multiplexing, the control information bit sequence $q_0, q_1, \ldots, q_{Q-1}$ can be arranged first and thereafter the data bit sequence $f_0, f_1, \ldots, f_{G-1}$ can be arranged. That is, if H=G+Q, $[g_0, g_1, \ldots, g_{H-1}]$ may be configured such as $[q_0, q_1, \ldots, q_{Q-1}, f_0, f_1, \ldots, f_{G-1}]$.

The multiplexed sequence $g_0, g_1, \ldots, g_{H-1}$ is mapped to a modulation sequence $h_0, h_1, \ldots, h_{H'-1}$ (step 280). Herein, $h_i$ denotes a modulation symbol on constellation, and $H'=H/Q_m$. $Q_m$ denotes the number of bits for each modulation symbol of a modulation scheme. For example, when quadrature phase shift keying (QPSK) is used as the modulation scheme, $Q_m=2$.

Each modulation symbol of the modulation sequence $h_0, h_1, \ldots, h_{H'-1}$ is mapped to a resource element for the PUSCH (step 290). The modulation symbols are mapped in a time-first manner.

Figure 4:
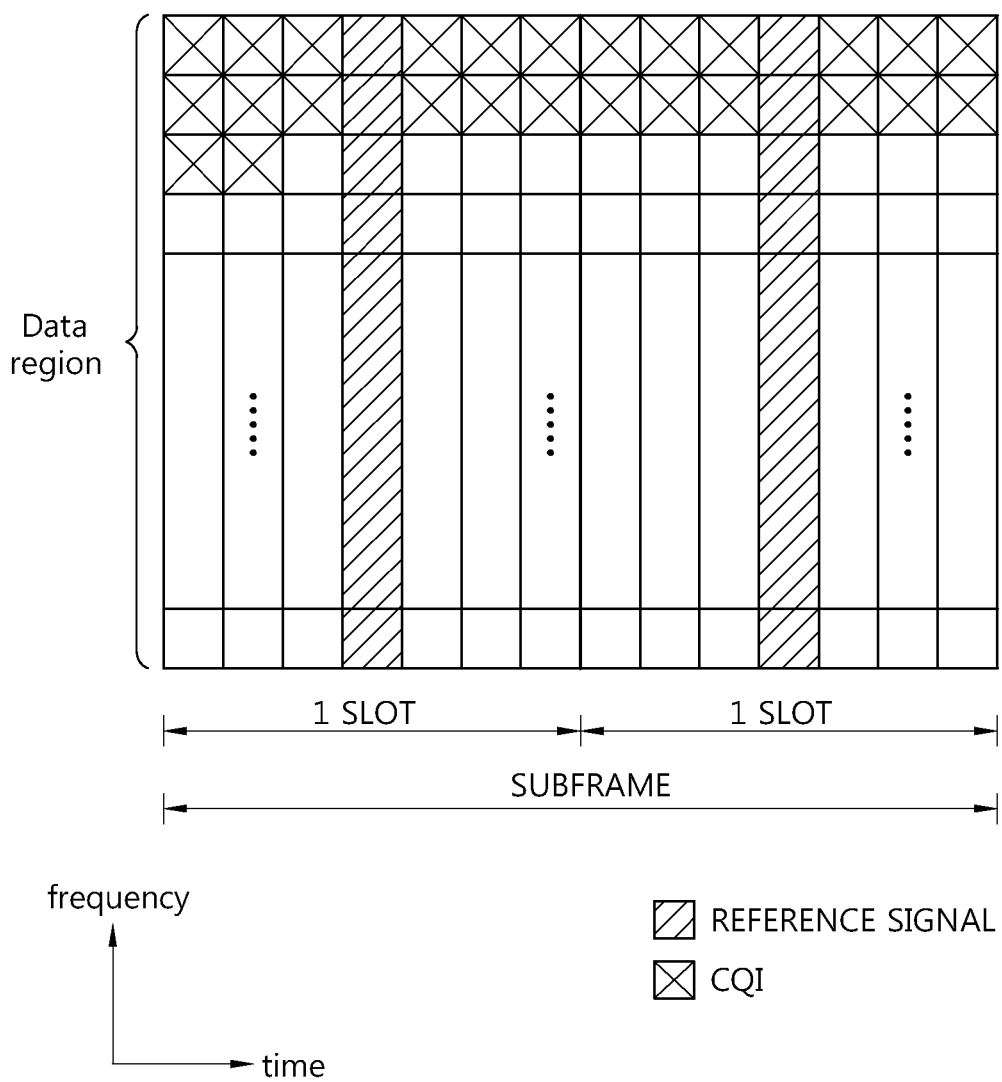
FIG. 4 shows resource mapping on a physical uplink shared channel (PUSCH).

FIG. 4 shows resource mapping on a PUSCH. One slot includes 7 SC-FDMA symbols. In each slot, a $4^{th}$ SC-FDMA symbol is used to transmit a reference signal. Therefore, up to 12 SC-FDMA symbols can be used for the PUSCH in one subframe. A modulation sequence $h_0, h_1, \ldots, h_{H'-1}$ is first mapped in a $1^{st}$ subcarrier region in an SC-FDMA symbol direction, and is then mapped in a $2^{nd}$ subcarrier region also in the SC-FDMA symbol direction. A front portion of the modulation sequence $h_0, h_1, \ldots, h_{H'-1}$ corresponds to a CQI. Thus, the CQI is first mapped to resource elements in a front subcarrier region.

Now, a multiple-carrier system will be described.

To support a higher data rate, a multiple-carrier system supporting a plurality of component carriers (CCs) is taken into account.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems. For example, if 5 CCs are assigned as a granularity of a carrier unit having a bandwidth of 20 MHz, a bandwidth of up to 100 MHz can be supported.

The CC can correspond to one cell. When a synchronization signal and a PBCH are transmitted in each CC, one DL CC may correspond to one cell. Therefore, a UE which communicates with a BS through a plurality of CCs may receive a service from a plurality of serving cells.

Figure 5:
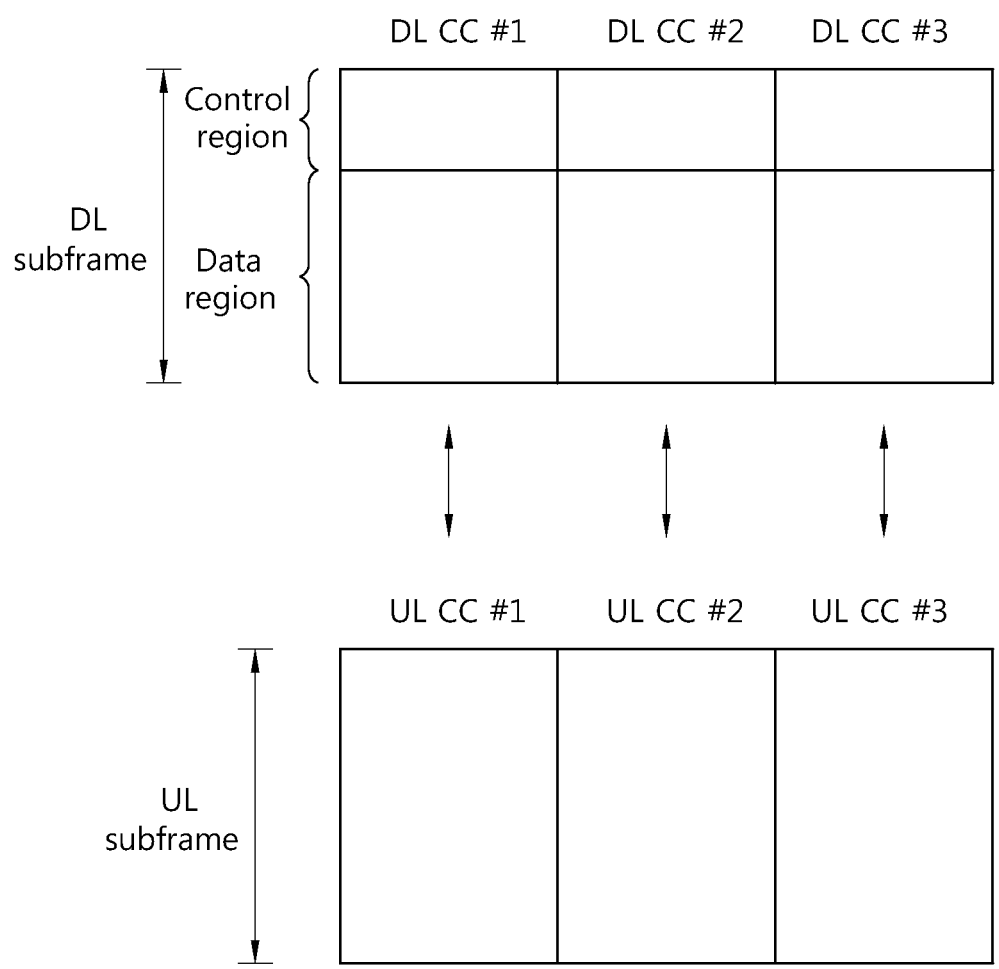
FIG. 5 shows an example of multiple carriers.

FIG. 5 shows an example of multiple carriers. Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC.

In a multi-carrier system, a CC linkage can be defined between a DL CC and a UL CC, The CC linkage implies a mapping relation between a DL CC in which a PDCCH for carrying a UL grant is transmitted and a UL CC scheduled by the UL grant. Alternatively, the CC linkage may be a mapping relation between a DL CC (or UL CC) in which data for HARQ is transmitted or a UL CC (or DL CC) in which an HARQ ACK/NACK signal is transmitted.

The example of FIG. 5 shows a symmetric CC linkage in which a DL CC and a UL CC are one-to-one mapped.

When the CC linkage is defined, two methods are possible as CC scheduling.

In a first method, the CC linkage is fixed. This is called a fixed CC linkage or a static CC linkage. A UL grant is transmitted through the DL CC. A UL transport block is transmitted by using the UL grant through a UL CC linked to the DL CC. Since a UL CC to be scheduled by the UL grant can be determined through a predefined CC linkage, additional signaling is not necessary.

In a second method, the CC linkage is dynamically or semi-statically changed or overridden. For example, a PDCCH and a PDSCH are transmitted in different DL CCs, or a PUSCH is transmitted on a UL CC not linked to a DL CC in which the PDCCH is transmitted. This is called cross-carrier scheduling.

Figure 6:
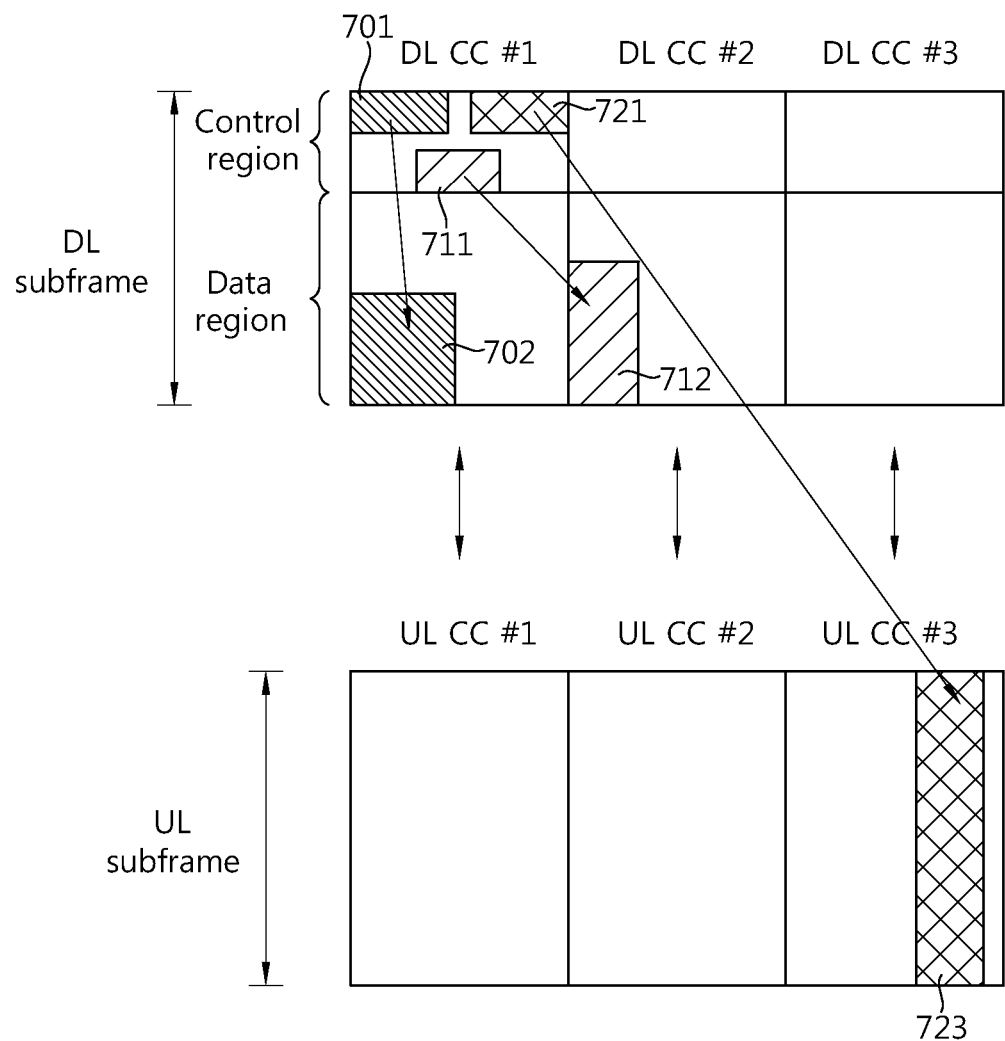
FIG. 6 shows an example of cross-carrier scheduling.

FIG. 6 shows an example of cross-carrier scheduling. It is assumed that a DL CC #1 is linked to a UL CC #1, a DL CC #2 is linked to a UL CC #2, and a DL CC #3 is linked to a UL CC #3.

A $1^{st}$ PDCCH 710 of the DL CC #1 carries DCI for a PDSCH 702 of the same DL CC #1. A $2^{nd}$ PDCCH 711 of the DL CC #1 carries DCI for a PDSCH 712 of the DL CC #2. A $3^{rd}$ PDCCH 721 of the DL CC #1 carries DCI for a PUSCH 722 of the unlinked UL CC #3.

For cross-carrier scheduling, the DCI of the PDCCH may include a carrier indicator field (CIF). The CIF indicates a DL CC or a UL CC scheduled through the DCI. The CIF may include an index of a UL CC or an index of a DL CC scheduled through the DCI. For example, the $2^{nd}$ PDCCH 711 may include a CIF indicating the DL CC #2. The $3^{rd}$ PDCCH 721 may include a CIF indicating the UL CC #3.

Meanwhile, a plurality of PUSCHs or PUCCHs can be transmitted simultaneously through a plurality of CCs in a multi-carrier system.

First, terminologies are defined as follows.

A multi-channel transmission mode is a mode capable of transmitting a plurality of UL channels (i.e., PUSCH and/or PUCCH) through a plurality of CCs.

A single-channel transmission mode is a mode capable of transmitting one UL channel (i.e., PUSCH and/or PUCCH) through one CC among the plurality of CCs.

According to self carrier piggyback, when UL control information is multiplexed to a UL transport block, the UL control information is control information transmitted in the same CC as a CC used in transmission of the UL transport block. When the UL transport block is not transmitted, the UL control information is transmitted on a PUCCH of the same CC.

According to cross carrier piggyback, when the UL control information is multiplexed to the UL transport block, the UL control information is control information transmitted in a CC different from a CC used in transmission of the UL transport block. For example, when the UL transport block is transmitted in a UL CC #1 and the UL transport block does not exist, the UL control information is transmitted on a PUSCH of a UL CC #2.

Figure 7:
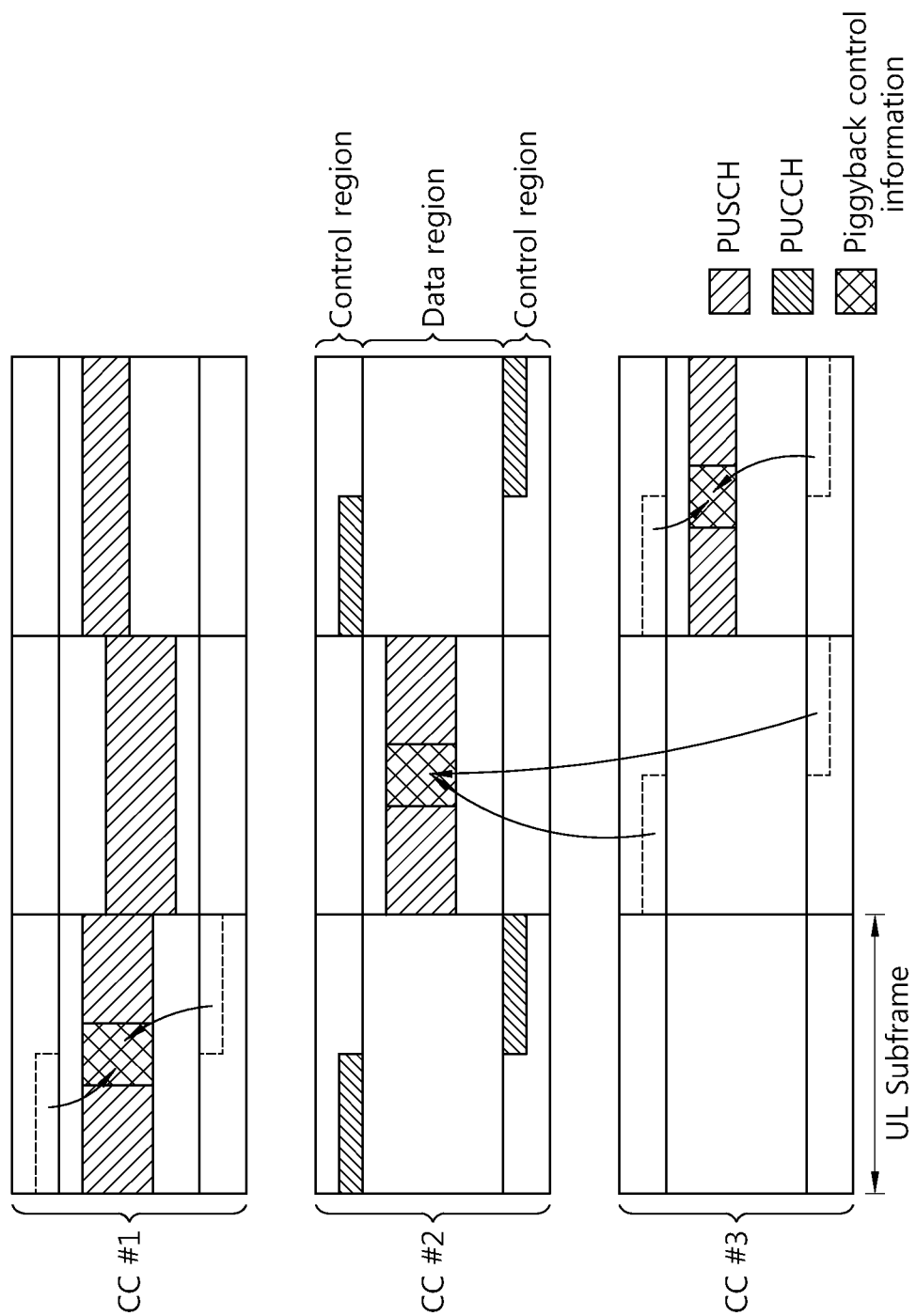
FIG. 7 shows an example of multi-channel transmission.

FIG. 7 shows an example of multi-channel transmission.

In a $1^{st}$ subframe of a CC #1, a UL transport block of the CC #1 and UL control information (or if a UL transport block does not exist, UL control information to be transmitted by being carried on a control dedicated channel) of the CC #1 are multiplexed and transmitted on a PUSCH. This is self carrier piggyback.

In a $2^{nd}$ subframe of a CC #2, a UL transport block of the CC #2 and UL control information of the CC #2 are multiplexed and transmitted on a PUSCH. This is cross carrier piggyback.

In a $3^{rd}$ subframe of a CC #3, a UL transport block of the CC #3 and UL control information of the CC #3 are multiplexed and transmitted on a PUSCH.

When a plurality of UL channels are transmitted on a plurality of CCs similarly to multi-channel transmission, a single-carrier property is no longer maintained, and a PAPR/CM property may deteriorate. In case of a UE located at a cell boundary, power shortage may occur due to a higher PAPR/CM property.

Multi-channel transmission is inevitable to increase frequency efficiency in a multi-carrier system. When in a multi-channel transmission mode, a PUSCH and a PUCCH may be transmitted simultaneously in one CC. In this case, similarly to the conventional 3GPP LTE, it is advantageous to piggyback UL control information to be transmitted on the PUCCH in terms of the PAPR/CM property.

In this case, although cross-carrier piggyback is advantageous in terms of the PAPR/CM property, there is a scheduling problem regarding a specific CC of which a PUSCH is used to multiplex UL control information and a problem of error handling complexity when a UL grant is missed.

Therefore, an embodiment of the present invention proposes to allow only the self carrier piggyback without allowing the cross carrier piggyback when a multi-channel transmission mode is possible.

A more detailed example is as follows. In the conventional 3GPP LTE, a PUCCH resource for HARQ ACK/NACK is obtained from a $1^{st}$ CCE used in a PDCCH for a corresponding DL grant. If it is assumed that cross carrier scheduling is allowed and thus a plurality of DL grants are scheduled in one DL CC, the plurality of DL grants can be scheduled for one or more CCs. The UE can feed back a plurality of HARQ ACKs/NACKs for the plurality of DL grants in one UL CC. The plurality of HARQ ACKs/NACKs can be multiplexed and transmitted on a PUSCH.

3GPP LTE does not support multiple antennas in UL transmission. However, in order to increase a data rate of UL transmission, it is considered to support multi-antenna transmission such as spatial multiplexing (SM). In case of the SM, interference may be severe, and thus the SM is suitable for a data channel in which HARQ is used but is not suitable for a control channel in which HARQ is not used. Therefore, when the PUSCH is transmitted through multiple antennas, it is not appropriate to multiplex the control information. In addition, a UE supporting the multiple antennas has an excellent channel state in general, and thus a power amplifier thereof is less limited in power.

Accordingly, the embodiment of the present invention proposes not to piggyback control information when multi-channel transmission and multi-antenna transmission are possible. That is, control information piggyback is not allowed. The PUCCH and the PUSCH are separately transmitted on one CC.

A limit of piggyback can be reported by the BS to the UE by using a part of system information or an RRC message. Alternatively, the piggyback can be limited when multi-antenna transmission is set without an additional message. For example, if a rank of UL transmission is set to 2 or higher, the piggyback can be limited. Alternatively, if a PDCCH having a specific DCI format is received, the piggyback can be limited.

Figure 8:
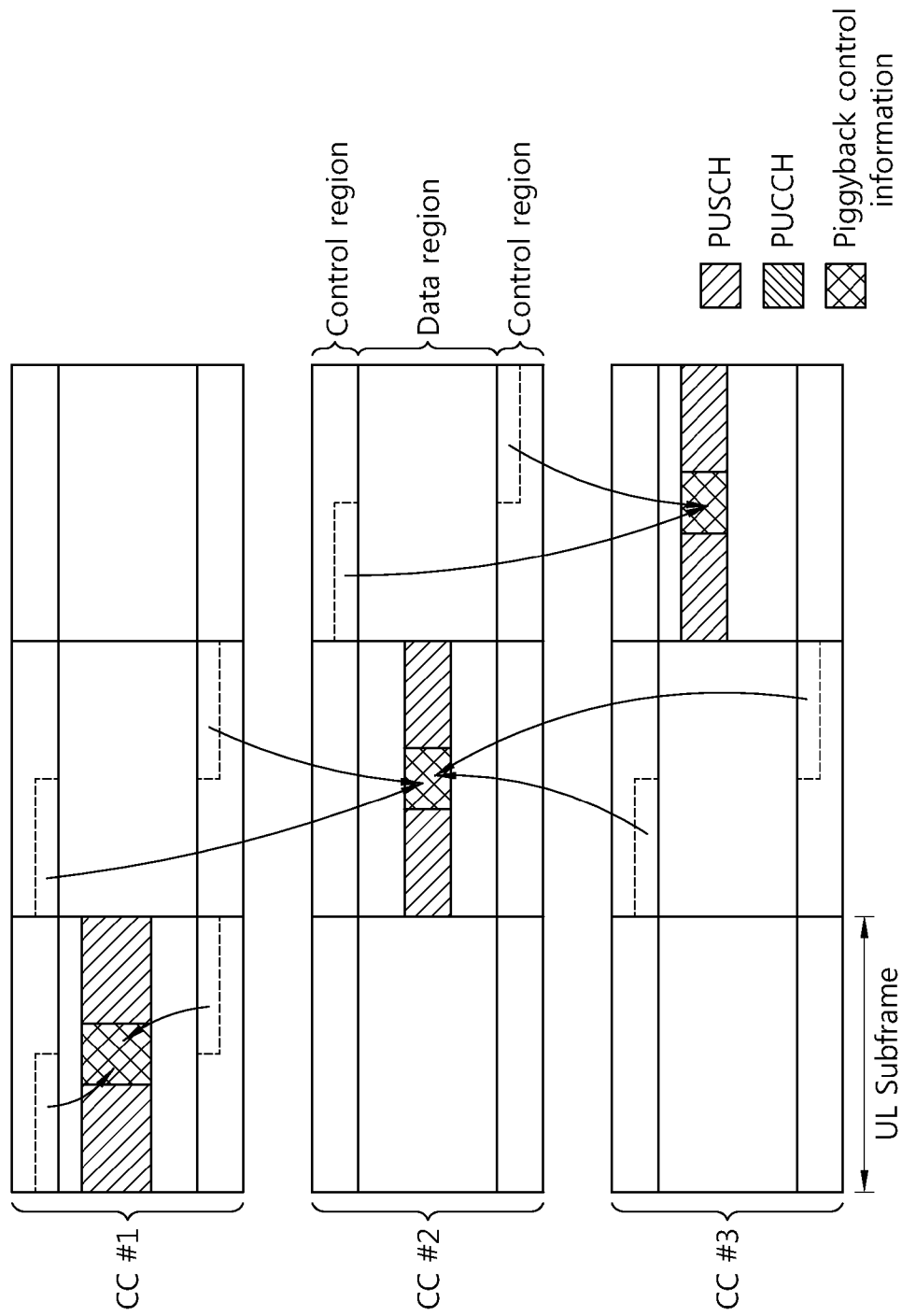
FIG. 8 shows an example of single-channel transmission.

FIG. 8 shows an example of single-channel transmission,

When a UE is located at a cell boundary, single-channel transmission is preferable since transmit power can be limited. The UE can be set to a single-channel transmission mode by an instruction from a BS.

According to an embodiment of the present invention, a single-channel transmission mode allows not only self carrier piggyback but also cross carrier piggyback unlike a multi-channel transmission mode. That is, in a specific subframe, UL control information for one or more CCs is multiplexed and transmitted on a PUSCH. However, there may be an exception that UL control information designated for some specific purposes is not piggybacked.

In a $1^{st}$ subframe of a CC #1, a UL transport block of the CC #1 and UL control information of the CC #1 are multiplexed and transmitted on a PUSCH. This is self carrier piggyback.

In a $2^{nd}$ subframe of a CC #2, a UL transport block of the CC #1 and the CC #3 is multiplexed to UL control information of the CC #2 and is then transmitted on a PUSCH. This is cross carrier piggyback.

In a $3^{rd}$ subframe of a CC #3, a UL transport block of the CC #3 and UL control information of the CC #2 are multiplexed and transmitted on a PUSCH.

Since the PUSCH is scheduled in one CC, the number of targets to which UL control information is piggybacked is limited to 1, and a PUCCH error, for example, a case where a PUCCH for scheduling the PUSCH is missed, is simply handled.

According to the section 10.1 of 3GPP TS 36.213 V8.7.0 (2009-05), 3GPP LTE time division duplex (TDD) supports ACK/NACK bundling. TDD differs from frequency division duplex (FDD) in that a UL subframe and a DL subframe coexist in one radio frame. In general, the number of UL subframes is less than the number of DL subframes. Therefore, since UL subframes for transmitting an ACK/NACK signal are not enough, it is supported to transmit a plurality of ACK/NACK signals for a plurality of DL transport blocks in one UL subframe. Bundling is an operation in which ACK is transmitted when decoding of all PDSCHs (i.e., DL transport blocks) received by a UE is successful, and otherwise NACK is transmitted. This is called bundling ACK/NACK.

When the plurality of ACKs/NACKs are transmitted on the PUCCH, the bundling ACK/NACK is transmitted. When the plurality of ACKs/NACKs are multiplexed on the PUSCH, each of the plurality of ACKs/NACKs can be multiplexed rather than the bundling ACK/NACK.

Figure 9:
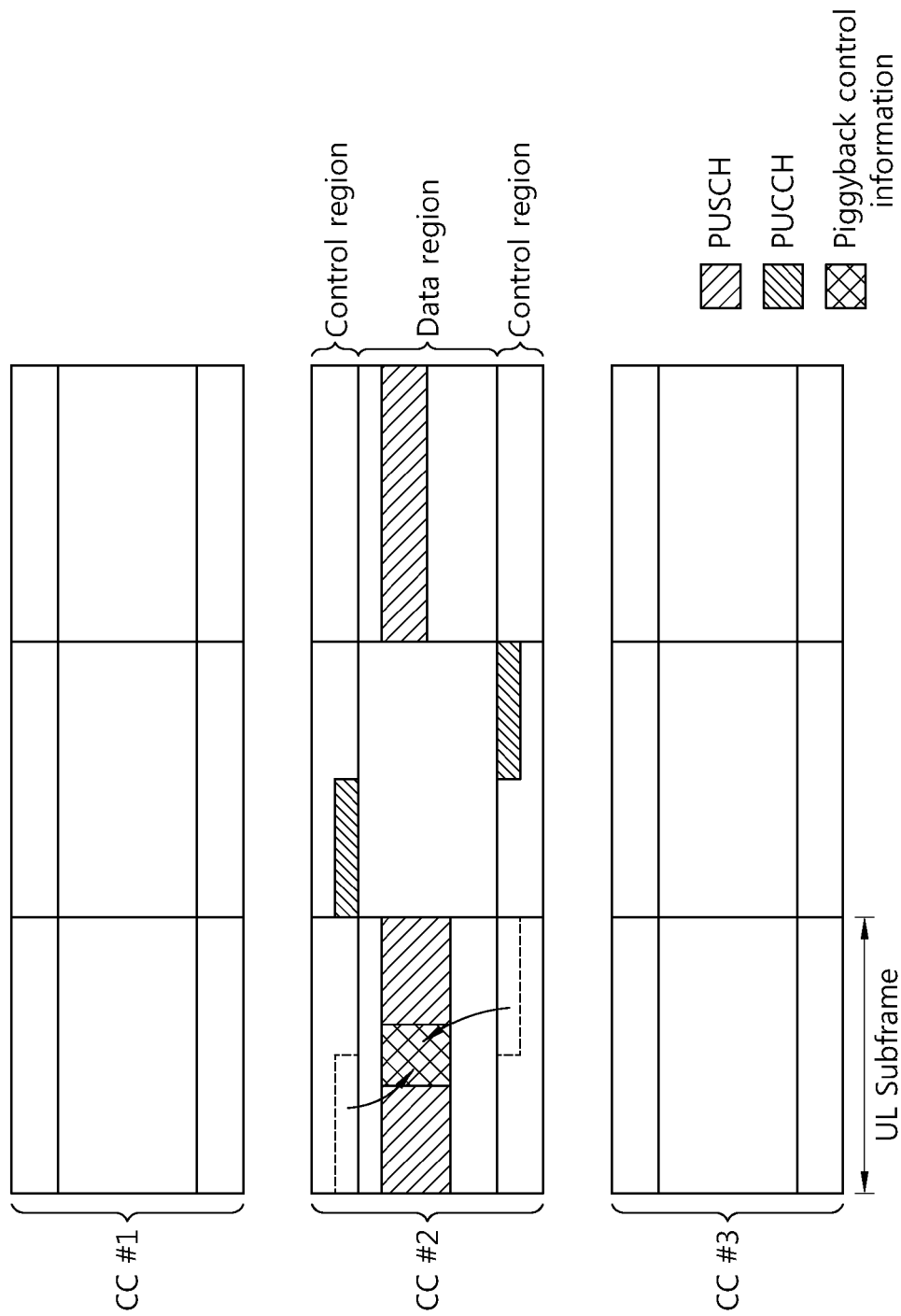
FIG. 9 shows another example of single-channel transmission.

FIG. 9 shows another example of single-channel transmission. This is a case where single-channel transmission is performed only through one CC. This is to limit a CC capable of single-channel transmission.

A CC in which a PUSCH and/or a PUCCH are transmitted is limited to a CC #2. The CC #2 is called a reference CC. The PUSCH and/or the PUCCH are not transmitted in a CC #1 and a CC #3. Only the CC #2 is assigned (or activated) to the UE, and the CC #1 and the CC #3 are not assigned or are deactivated.

Since a plurality of DL CCs can be assigned even if the number of reference UL CCs is limited to one, a plurality of PUCCHs (i.e., a plurality of ACKs/NACKs) may be necessary. When one reference UL CC is assigned, the UE can transition to a single-channel transmission mode. Alternatively, the BS can instruct the UE to transition to the single-channel transmission mode.

When transitioning to the single-channel mode, the plurality of ACKs/NACKs can be multiplexed and transmitted on the PUSCH. The plurality of ACKs/NACKs can be transmitted on the PUCCH by using bundling or channel selection.

Figure 10:
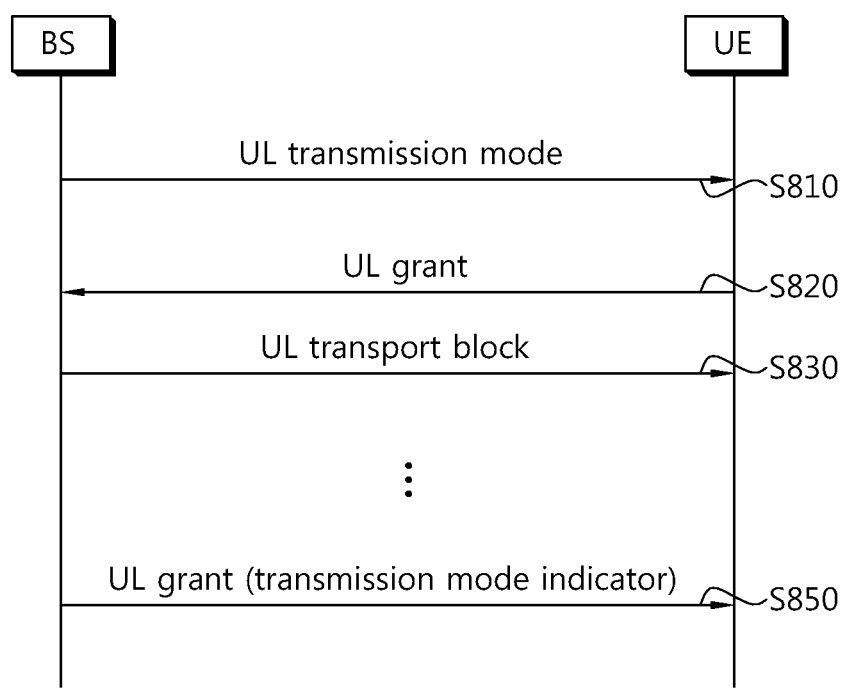
FIG. 10 is a flowchart showing a method of uplink transmission according to an embodiment of the present invention.

FIG. 10 is a flowchart showing a method of UL transmission according to an embodiment of the present invention.

A UE receives information regarding a UL transmission mode from a BS, and configures a UL transmission mode (step S810). The UL transmission mode may be a multi-channel transmission mode or a single-channel transmission mode. In addition, the UE may further receive information regarding a multi-antenna transmission mode from the BS.

The UE receives a UL grant including a UL resource allocation from the BS through a PDCCH (step S820).

The UE transmits a UL transport block through a PUSCH by using the UL resource allocation according to the UL transmission mode (step S830). When the UL transmission mode is the multi-channel transmission mode, cross carrier piggyback is not allowed, and only self carrier piggyback is allowed. When the UL transmission mode is the single-channel transmission mode, both of the cross carrier piggyback and the self carrier piggyback are allowed.

The UL transmission mode can be changed dynamically. The changed UL transmission mode can be valid during a specific subframe period. The subframe period includes one or more subframes.

A transmission mode indicator is a code point or a field indicating the UL transmission mode. The transmission mode indicator may be included in a UL grant.

The BS can transmit the UL grant including the transmission mode indicator to the UE (step S850). The UE can determine whether to apply the cross carrier piggyback according to the UL transmission mode indicated by the transmission mode indicator.

The reason of allowing only the self carrier piggyback in the multi-channel transmission mode is that error handling is complex when the UE misses even one of a plurality of UL grants.

It is assumed that the BS schedules one PUSCH, and transmits one UL grant to the UE. The UE can multiplex UL control information to a PUSCH scheduled by the UL grant. Even if the UE misses the UL grant, the UE can transmit the UL control information through the PUCCH as defined in the multi-channel transmission mode.

The transmission mode indicator may indicate whether to multiplex the UL control information or may indicate that one PUSCH is scheduled in a specific subframe period.

The plurality of CCs may have frequency intervals spaced far apart from one another. A plurality of power amplifiers are used for the plurality of CCs, and a CM property is determined for each power amplifier. Therefore, an operation depending on the aforementioned transmission mode can be defined for each power amplifier. For example, the single-channel transmission mode can be defined in a CC group unit belonging to each power amplifier, and cross carrier piggyback can also be applied in the CC group unit.

The multi-channel transmission mode or the single-channel transmission mode is set according to a channel state or a transmit power limit of the UE. The PAPR/CM property can be prevented from deterioration, and battery consumption of the UE caused by UL transmission can be decreased.

Figure 11:
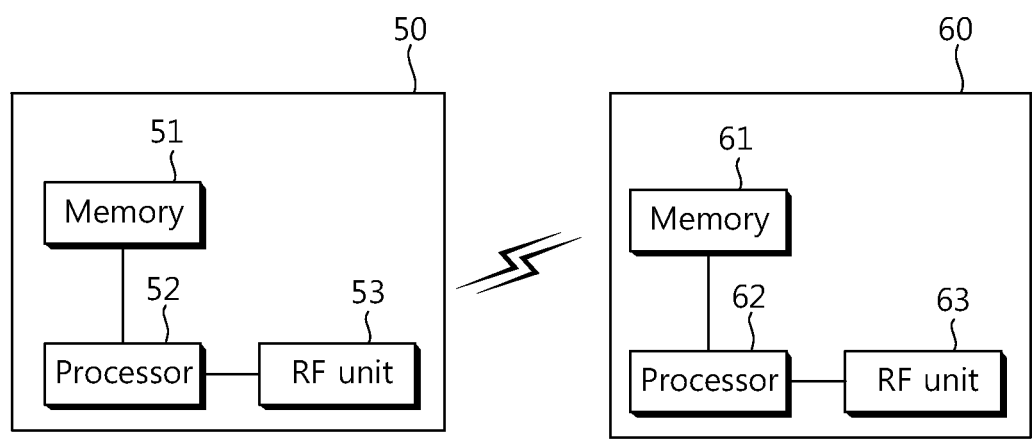
FIG. 11 is a block diagram showing a wireless communication system according to an embodiment of the present invention.

FIG. 11 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. The processor 51 can implement an operation of the BS 50 according to the embodiments of FIG. 7 to FIG. 10.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. The processor 61 can implement an operation of the UE 60 according to the embodiments of FIG. 7 to FIG. 10.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for uplink transmission in a wireless communication system, the method performed by a user equipment (UE) and comprising:
  setting an uplink transmission mode for a plurality of uplink component carriers (CCs) based on a transmission mode indicator, wherein the set uplink transmission mode corresponds to one of a multi-channel transmission mode that transmits a plurality of uplink channels through each uplink CC and a single-channel transmission mode that transmits one uplink channel per uplink CC;
  scheduling a first uplink transmission block and first control information in a first uplink CC in a first subframe;
  scheduling a second uplink transmission block in a second uplink CC and second control information in a third uplink CC in the first subframe;
  performing a self-carrier piggyback process in the first subframe such that the first control information in the first uplink CC is multiplexed to the first uplink transmission block in the first uplink CC, based on that the set uplink transmission mode corresponds to the multi-channel transmission mode; and
  transmitting a plurality of uplink shared channels of the plurality of uplink CCs on the first subframe, based on that the set uplink transmission mode corresponds to the multi-channel transmission mode,
  wherein the transmission mode indicator indicates whether the uplink transmission mode corresponds to the multi-channel transmission mode or the single-channel transmission mode,
  wherein the transmission mode indicator is transmitted from a base station,
  wherein the UE determines whether to perform a cross carrier piggyback according to the uplink transmission mode indicated by the transmission mode indicator, and
  wherein the cross carrier piggyback is not allowed to be performed in the first subframe such that the second control information in the third uplink CC is multiplexed to the second uplink transmission block in the second uplink CC, when the uplink transmission mode corresponds to the multi-channel transmission mode.

2. The method of claim 1, wherein the setting of the uplink transmission mode comprises receiving information regarding the uplink transmission mode from a base station.

3. The method of claim 1, further comprising:
  receiving a transition indication which instructs a change from the multi-channel transmission mode to the single-channel transmission mode.

4. The method of claim 3, further comprising:
  when the transition indication is received, piggybacking uplink control information in uplink control channels of one or more of the uplink CCs onto an uplink shared channel of a specific one of the uplink CCs.

5. The method of claim 4, further comprising:
  when the transition indication is received, transmitting the uplink shared channel of the specific uplink component carrier, onto which the uplink control information of the one or more of the uplink CCs is piggybacked.

6. The method of claim 4, wherein the uplink control information includes at least one of a channel quality indicator (CQI) and a positive-acknowledgement (ACK)/negative-acknowledgement (NACK) for hybrid automatic repeat request (HARQ).

7. A user equipment for uplink transmission in a wireless communication system, the UE comprising:
  a transceiver configured to transmit and receive a radio signal, aggregate a plurality of downlink component carriers (CCS) and aggregate a plurality of uplink CCs; and
  a processor coupled to the transceiver and configured to:
  set an uplink transmission mode for the plurality of uplink CCs based on a transmission mode indicator, wherein the set uplink transmission mode corresponds to one of a multi-channel transmission mode that transmits a plurality of uplink channels through each uplink CC and a single-channel transmission mode that transmits one uplink channel per uplink CC,
  schedule a first uplink transmission block and first control information in a first uplink CC in a first subframe,
  schedule a second uplink transmission block in a second uplink CC and second control information in a third uplink CC in the first subframe,
  perform a self-carrier piggyback process in the first subframe such that the first control information in the first uplink CC is multiplexed to the first uplink transmission block in the first uplink CC, based on that the set uplink transmission mode corresponds to the multi-channel transmission mode, and
  control the transceiver to transmit a plurality of uplink channels of the plurality of uplink CCs on the first subframe, based on that the set uplink transmission mode corresponds to the multi-channel transmission mode,
  wherein the transmission mode indicator indicates whether the uplink transmission mode corresponds to the multi-channel transmission mode or the single-channel transmission mode, wherein the transmission mode indicator is transmitted from a base station, wherein the UE determines whether to perform a cross carrier piggyback according to the uplink transmission mode indicated by the transmission mode indicator, and wherein the cross carrier piggyback is not allowed to be performed in the first subframe such that the second control information in the third uplink CC is multiplexed to the second uplink transmission block in the second uplink CC, when the uplink transmission mode corresponds to the multi-channel transmission mode.

8. The UE of claim 7, wherein the processor is further configured to:

control the transceiver to receive information regarding the uplink transmission mode from a base station.

9. The UE of claim 7, wherein the processor is further configured to:

control the transceiver to receive a transition indication which instructs a change from the multi-channel transmission mode to the single-channel transmission mode.

10. The UE of claim 9, wherein the processor is further configured to:

when the transition indication is received, piggyback uplink control information in uplink control channels of one or more of the uplink CCs onto an uplink shared channel of a specific one of the uplink CCs.

11. The UE of claim 10, wherein the processor is further configured to:

when the transition indication is received, transmit the uplink shared channel of the specific uplink CC, onto which the uplink control information of the one or more of the uplink CCs is piggybacked.

12. The UE of claim 10, wherein the uplink control information includes at least one of a channel quality indicator (CQI) and a positive-acknowledgement (ACK)/negative-acknowledgement (NACK) for hybrid automatic repeat request (HARQ).

* * * * *